United States Patent [19]
Yamanaka et al.

[11] 4,135,066
[45] * Jan. 16, 1979

[54] DISTRIBUTOR FOR INTERNAL COMBUSTION ENGINE CONTAINING APPARATUS FOR SUPPRESSING NOISE

[75] Inventors: Teruo Yamanaka; Osamu Hori, both of Toyota, Japan

[73] Assignee: Toyota Jidosha Kogyo Kabushiki Kaisha, Toyota, Japan

[*] Notice: The portion of the term of this patent subsequent to Aug. 2, 1994, has been disclaimed.

[21] Appl. No.: 753,375

[22] Filed: Dec. 22, 1976

Related U.S. Application Data

[63] Continuation-in-part of Ser. No. 566,936, Apr. 10, 1975, Pat. No. 4,039,787.

[30] Foreign Application Priority Data

Apr. 20, 1974 [JP] Japan .................................. 49-44734

[51] Int. Cl.² ........................ H01H 19/00; F02P 1/00
[52] U.S. Cl. ........................ 200/19 R; 123/146.5 A; 123/148 P; 200/19 DC; 200/19 DR
[58] Field of Search .......... 200/19 R, 19 DC, 19 DR; 123/146.5 A, 148 P

[56] References Cited

U.S. PATENT DOCUMENTS 4,039,787  8/1977  Hori et al. .......................... 200/19 R Primary Examiner—James R. Scott
Attorney, Agent, or Firm—Stevens, Davis, Miller & Mosher

[57] ABSTRACT

A distributor containing an apparatus for suppressing noise is described, comprising a first spark discharging gap and a second spark discharging gap which exists close to the first spark discharging gap both of which are located between the electrodes of a distributor rotor and a stationary terminal, wherein the second spark discharging gap is formed through a dielectric member which is fixed to the distributor rotor and/or a stationary terminal, and the gap distance of the second spark discharging gap is shorter than that of the first spark discharging gap. The difference between the first spark discharging gap distance and the second spark discharging gap distance should be less than 3mm but greater than 0.2mm. Preferably, the difference should be less than 1.5mm but greater than 0.5mm.

10 Claims, 25 Drawing Figures

Fig. 1 (PRIOR ART)
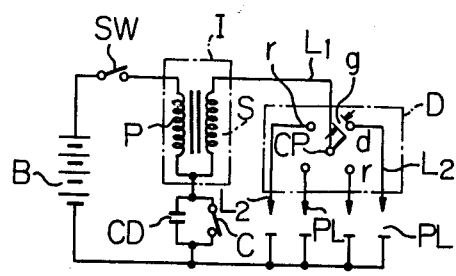
Fig. 2-a (PRIOR ART)
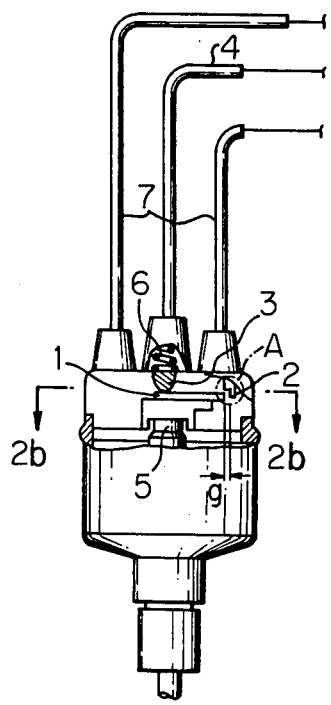
Fig. 2-b (PRIOR ART)
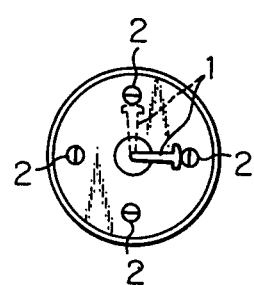

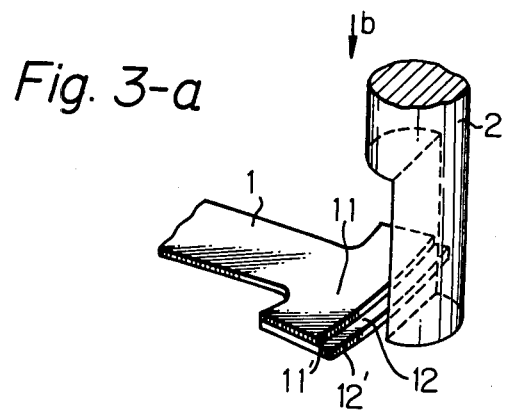
Fig. 3-a
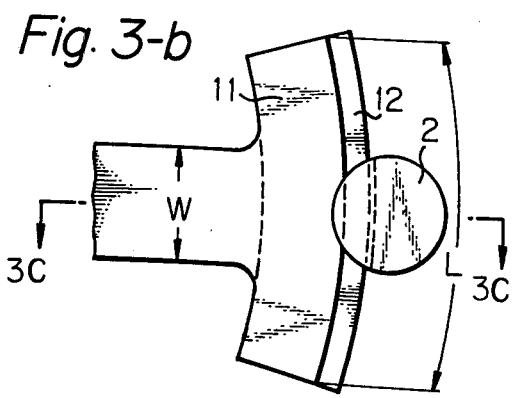
Fig. 3-b
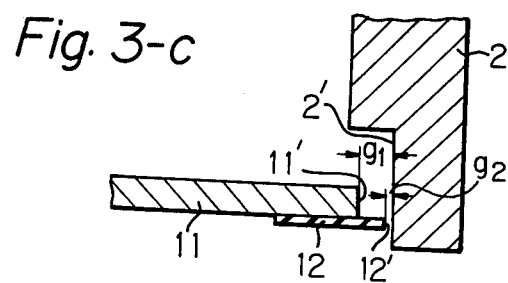
Fig. 3-c

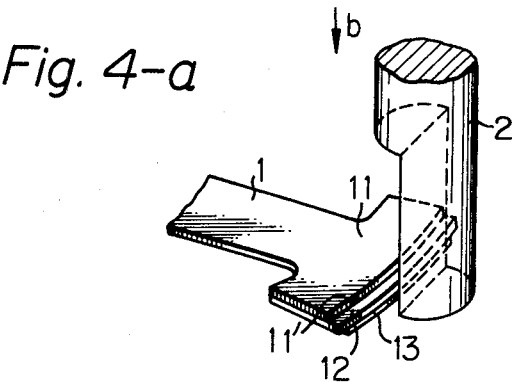
Fig. 4-a
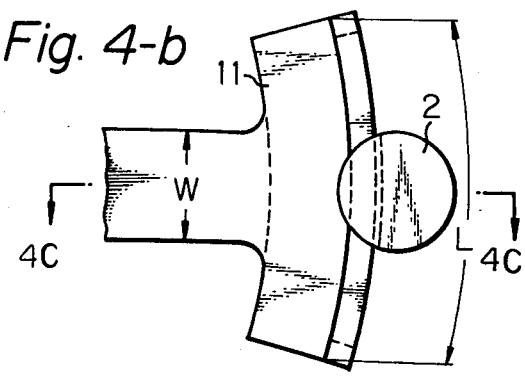
Fig. 4-b
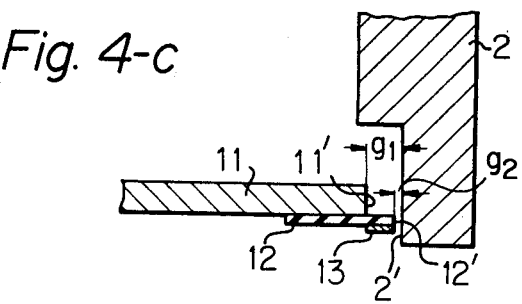
Fig. 4-c

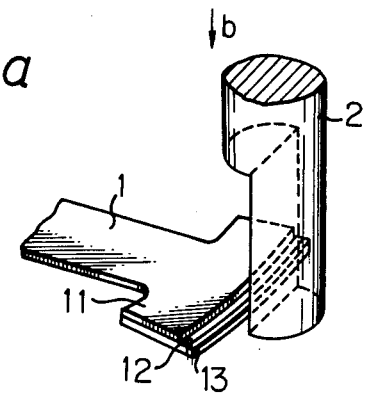
Fig. 5-a
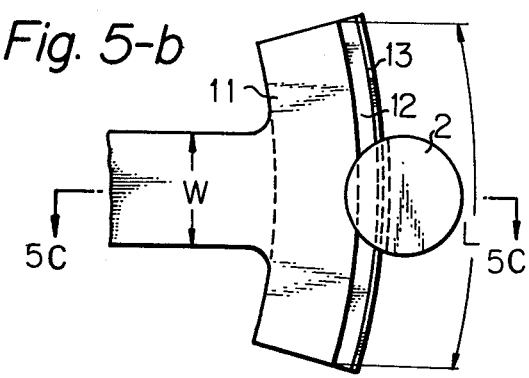
Fig. 5-b
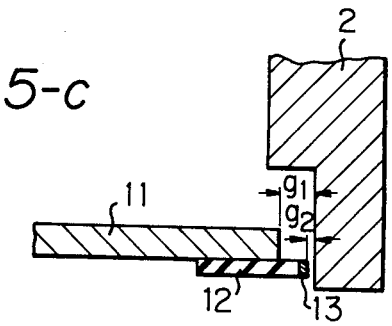
Fig. 5-c

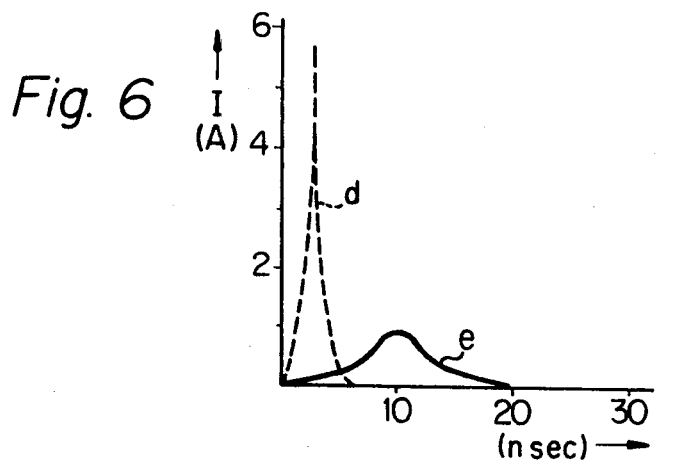
Fig. 6
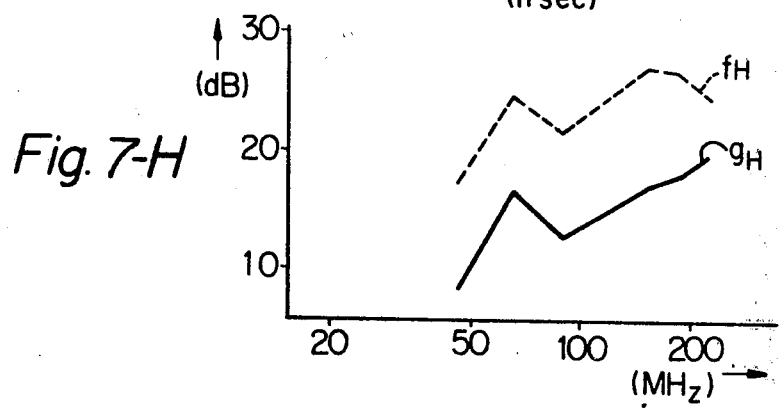
Fig. 7-H
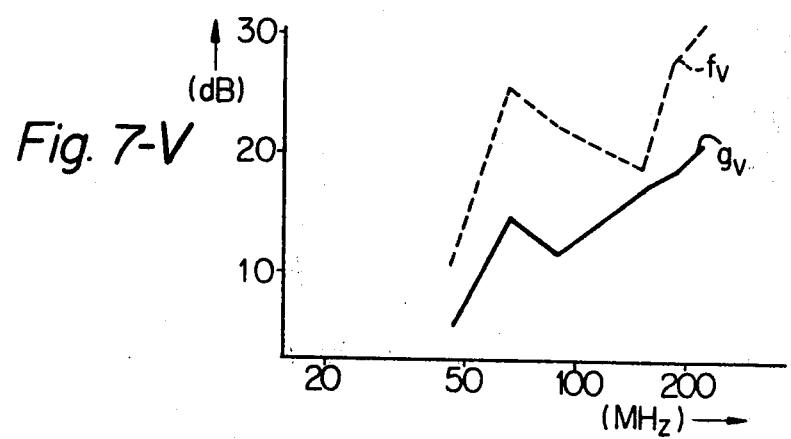
Fig. 7-V

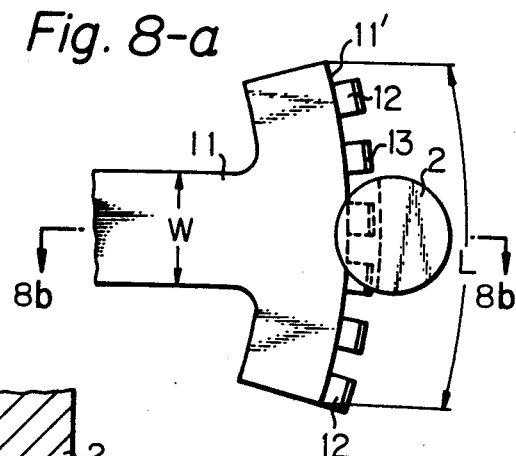
Fig. 8-a
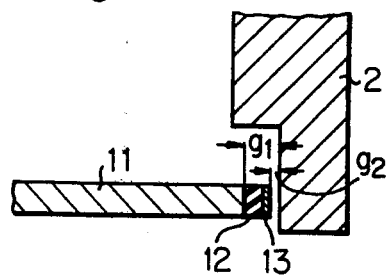
Fig. 8-b
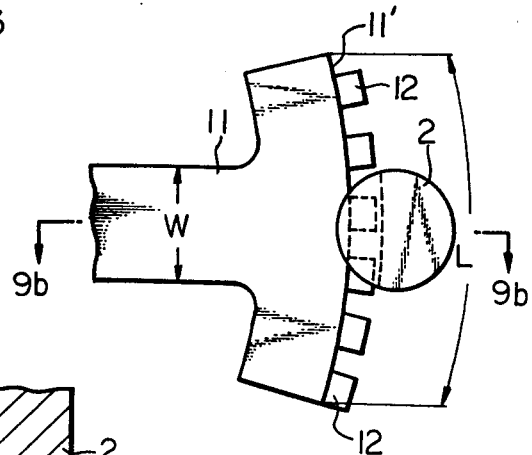
Fig. 9-a
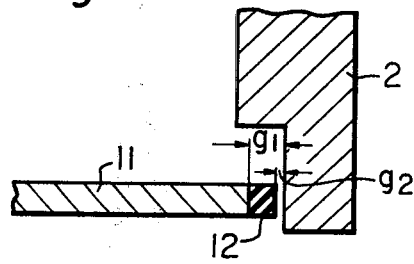
Fig. 9-b

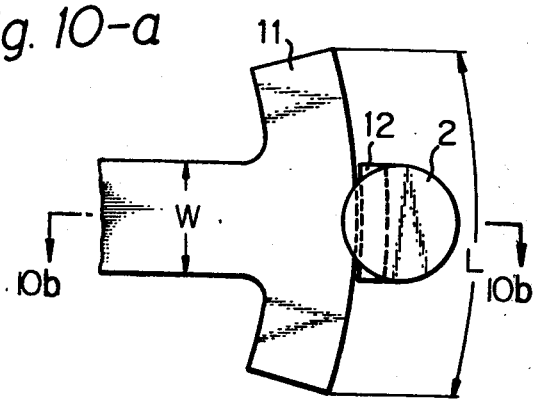
Fig. 10-a
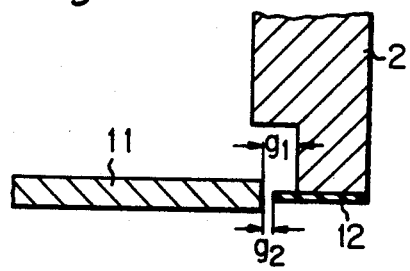
Fig. 10-b
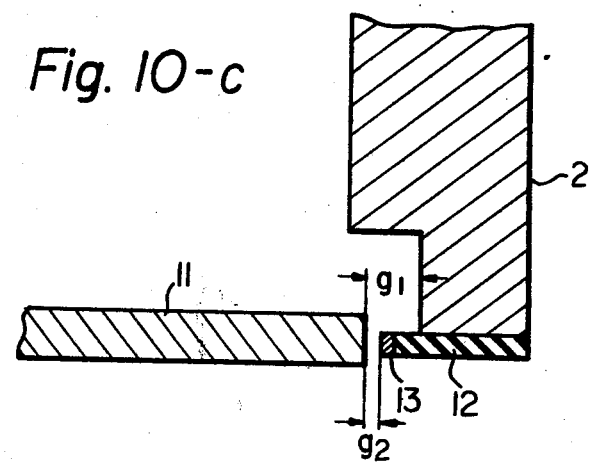
Fig. 10-c

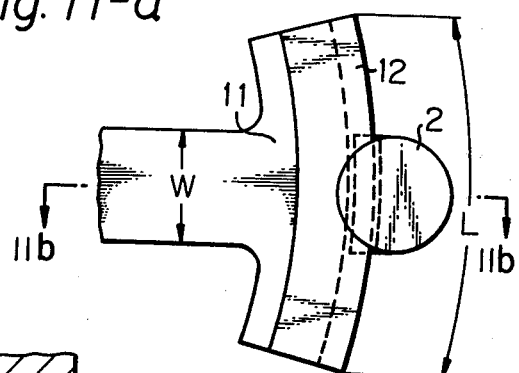
Fig. 11-a
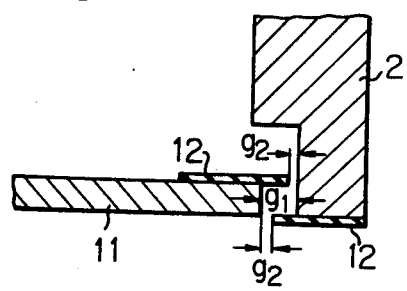
Fig. 11-b
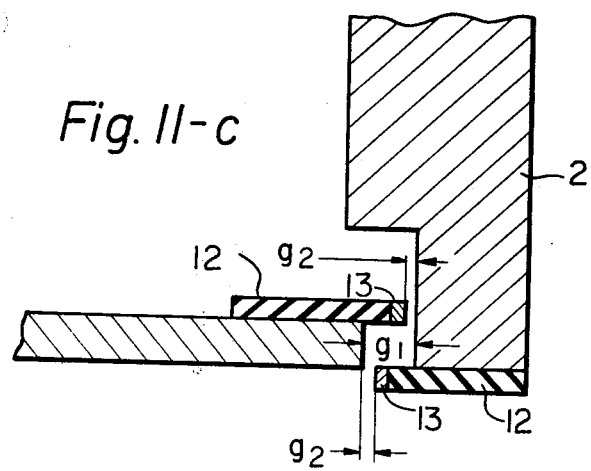
Fig. 11-c

DISTRIBUTOR FOR INTERNAL COMBUSTION ENGINE CONTAINING APPARATUS FOR SUPPRESSING NOISE

This application is a continuation-in-part application of the copending U.S. Pat. application Ser. No. 566,936 filed on Apr. 10, 1975, now U.S. Pat. No. 4,039,787.

BACKGROUND OF THE INVENTION

The present invention relates generally to an apparatus for suppressing noise which radiates from the ignition system of an internal combustion engine, and more particularly relates to an apparatus for suppressing noise which generates from the electrodes of the distributor rotor and the stationary terminals, which are located in the distributor.

The igniter in which an electric current has to be intermitted quickly in order to generate a spark discharge, radiates the noise which accompanies the occurrence of the spark discharge. It is well-known that such noise disturbs radio broadcasting service, television broadcasting service and other kinds of radio communication systems and, as a result the noise deteriorates the signal-to-noise ratio of each of the above-mentioned services and systems. Further, it should be recognized that the noise also causes operational errors in electronic control circuits which will undoubtedly be more widely and commonly utilized in the near future as vehicle control systems, for example E.F.I. (electronic-controlled fuel injection system), E.S.C. (electronic-controlled skid control system) or E.A.T. (electronic-controlled automatic transmission system).

As a result of such errors traffic safety will be threatened. In addition, the tendency for an electric current flowing in the igniter to become very strong and to be intermitted very quickly to generate a strong spark discharge, will become a common occurrence because of the increasing emphasis on clean exhaust gas. However, a strong spark discharge is accompanied by an extremely strong noise which increases the previously-mentioned disturbance and operational errors.

For the purpose of suppressing the noise various kinds of apparatus or devices have been proposed. However, most of the proposed apparatus or devices are too expensive for practical use in mass-produced vehicles. Further, these apparatus or devices are not, in practice, reliable. One prior art example which is considered to have practical value, is provided by the Japanese Patent Publication No. 48-12012. In this Japanese Patent, the spark gap between the electrodes of the distributor rotor and the stationary terminal in the distributor is selected to be between 1.524 (mm) and 6.35 (mm), which is wider than the spark gap used in the typical distributor.

In the prior art, there are three kinds of typical apparatus for suppressing noise. A first typical one is the resistor which is S, L, or K-shaped and is attached to the external terminal of the spark plug, wherein, in some cases, the resistor is contained in the spark plug and hence, is called a resistive spark plug. A second typical one is also a resistor which is inserted in one portion of the high tension cable and hence, is called a resistive high tension cable. A third typical one is the noise suppressing capacitor. However, the prior art apparatus for suppressing noise, mentioned above, are defective in that although they can suppress noise to a certain intensity level, that level is not less than the noise level which must be suppressed in the fields of the above-mentioned broadcasting services, radio communication systems and electronic-controlled vehicle control systems. Moreover, the noise suppressing capacitor has no effect on high-frequency noises.

Therefore, it is the principal object of the present invention to provide an apparatus for suppressing noise and to do so more effectively than that of the prior art. Another object of the present invention is to provide a highly reliable apparatus for suppressing noise at a moderate price for use in vehicles which are mass-produced.

BRIEF DESCRIPTION OF THE DRAWINGS

The present invention will be more apparent from the ensuing description with reference to the accompanying drawings wherein:

FIG. 1 is a typical conventional wiring circuit diagram of an igniter;

FIG. 2-a is a side view, partially cut off, showing a typical distributor;

FIG. 2-b is a sectional view taken along the line 2b—2b of FIG. 2-a;

FIG. 3-a is a perspective view of a first embodiment according to the present invention;

FIG. 3-b is a plan view seen from the arrow b of FIG. 3-a;

FIG. 3-c is a sectional view taken along the line 3c—3c of FIG. 3-b;

FIG. 4-a is a perspective view of a second embodiment according to the present invention;

FIG. 4-b is a plan view seen from the arrow b of FIG. 4-a;

FIG. 4-c is a sectional view taken along the line 4c—4c of FIG. 4-b;

FIG. 5-a is a perspective view of a third embodiment according to the present invention;

FIG. 5-b is a plan view seen from the arrow b of FIG. 5-a;

FIG. 5-c is a sectional view taken along the line 5c—5c of FIG. 5-b;

FIG. 6 is a graph showing changes of a current flow (in A), which is the so-called capacity discharge current, in the igniter of the prior art and the igniter of the present invention with respect to time (in n sec);

FIGS. 7-H and 7-V are graphs showing changes of the noise-field intensity level (in dB) of the horizontal polarization and of the vertical polarization, respectively which are produced by the igniter of the prior art and the igniter of the present invention with respect to an observed frequency (in $MH_z$);

FIG. 8-a is a plan view of a fourth embodiment according to the present invention;

FIG. 8-b is a sectional view taken along the line 8b—8b of FIG. 8-a;

FIG. 9-a is a plan view of a fifth embodiment according to the present invention;

FIG. 9-b is a sectional view taken along the line 9b—9b of FIG. 9-a;

FIG. 10-a is a plan view of a sixth embodiment according to the present invention;

FIG. 10-b is a sectional view taken along the line 10b—10b of FIG. 10-a;

FIG. 10-c is a sectional view of an alternate embodiment shown in FIG. 10b;

FIG. 11-a is a plan view of a seventh embodiment according to the present invention; and FIG. 11-b is a sectional view taken along the line 11b—11b of FIG. 11-a;

FIG. 11-c is a sectional view of an alternate embodiment shown in FIG. 11-b.

DETAILED DESCRIPTION OF THE INVENTION

FIG. 1 is a typical conventional wiring circuit diagram of the igniter, the construction of which depends on the well-known battery type ignition system. In FIG. 1, a DC current which is supplied from the positive terminal of a battery B flows through an ignition switch SW, a primary winding P of an ignition coil I and a contact point C which is connected in parallel to a capacitor CD, to the negative terminal of the battery B. When the distributor cam (not shown) rotates in synchronization with the rotation of the crank-shaft located in the internal combustion engine, the distributor cam cyclically opens and closes the contact point C. When the contact point C opens quickly, the primary current suddenly stops flowing through the primary winding P. At this moment a high voltage is electromagnetically induced through a secondary winding S of the ignition coil I. The induced high-voltage surge, which is normally 10-30 (KV), leaves the secondary coil S and travels through a primary high tension cable $L_1$ to a center piece CP which is located in the center of the distributor D. The center piece CP is electrically connected to the distributor rotor d which rotates within the rotational period synchronized with said crank-shaft. Four stationary terminals r, assuming that the engine has four cylinders, in the distributor D are arranged with the same pitch along a circular locus which is defined by the rotating electrode of the rotor d, maintaining a small gap g between the electrode and the circular locus. The induced high-voltage surge is further fed to the stationary terminals r through said small gap g each time the electrode of the rotor d comes close to one of the four stationary terminals r. Then, the induced high-voltage surge leaves one of the terminals r and further travels through a secondary high tension cable $L_2$ to a corresponding spark plug PL, where a spark discharge occurs in the corresponding spark plug PL and ignites the fuel air mixture in the corresponding cylinder.

It is a well-known phenomenon that noise is radiated with the occurrence of a spark discharge. As can be seen in FIG. 1, three kinds of spark discharge occur at three portions in the igniter, respectively. A first spark discharge occurs at the contact point C of the contact breaker. A second spark discharge occurs at the small gap g between the electrode of the rotor d and the electrode of the terminal r. A third spark discharge occurs at the spark plug PL.

In various kinds of experiments, the inventors discovered that among the three kinds of spark discharge, although the first and third spark discharges can be suppressed ordinarily by the capacitor and resistive spark plug, respectively, the second spark discharge which occurs at the small gap g between the electrode of the rotor d and the electrode of the terminal r, still radiates the strongest noise compared with the first and third spark discharge. This is because the second spark discharge includes a spark discharge, the pulse width of which is extremely small and the discharge current of which is extremely large. This spark discharge radiates the strongest noise from the high tension cables $L_1$ and $L_2$, which act as antennae.

The reason for the production of a spark discharge with an extremely small pulse width and an extremely large discharge current has already been explained in detail in U.S. Pat. No. 3,949,721.

A summary of the reason is as follows. In FIG. 1, the high voltage from the secondary winding S appears at the rotor d not as a step-like wave, but as a wave in which the voltage at the rotor d increases and reaches said high voltage gradually with a time constant, the value of which being mainly decided by the circuit constants of the ignition coil I and the primary high tension cable $L_1$ etc. When the voltage which appears at the rotor d increases and reaches a sufficient voltage, it causes a spark discharge at the gap g between the electrodes of the rotor d and the terminal r. At the same time, the electric charge, which has been charged in a distributed capacity along the primary high tension cable $L_1$, moves to a distributed capacity along the secondary high tension cable $L_2$ through said spark discharge, which is generally called a capacity discharge. A voltage level along the primary high tension cable $L_1$ momentarily decreases when the capacity discharge occurs. However, immediately after said capacity discharge occurs, a voltage at the spark plug PL gradually increases with a certain time constant, and when said voltage reaches an adequate level, the spark discharge occurs at the spark plug PL. This spark discharge is generally called an inductive discharge. Thereby, one ignition process is completed. Thus, a spark discharge current which flows through the small gap g, is produced in accordance with the capacity discharge and the inductive discharge, respectively. Above all, the strongest noise accompanied by deleterious high frequencies has been found in connection with a capacity discharge which includes a great deal of discharge pulses having an extremely small pulse width and an extremely large discharge current. Therefore, the principles of the present invention are to transform said wave of the capacity discharge current into a wave with a relatively large pulse width and a relatively small discharge current. Therefore, the deleterious high frequency components are considerably lessened because of the stabilized capacity discharge current of the latter by the above-mentioned transformation of the wave.

The construction used to realize the transformation of the wave of said capacity discharge current according to the present invention will now be explained. In FIGS. 2-a and 2-b, 1 indicates a distributor rotor (corresponding to d in FIG. 1), and 2 indicates a stationary terminal (corresponding to r in FIG. 1). The electrode of rotor 1 and the electrode of terminal 2 face each other with said small gap g (FIG. 2-a) located between them. A center piece 3 (corresponding to CP in FIG. 1) touches the inside end portion of the rotor 1. The induced high voltage surge at the secondary winding S (FIG. 1) travels through a primary high tension cable 4 (corresponding to $L_1$ in FIG. 1) and through the center piece 3 to the electrode of the rotor 1. A spring 6 pushes the center piece 3 downward to the rotor 1, thereby making a tight electrical connection between them. At the time when the electrode of the rotor 1, which is indicated by the solid line in FIG. 2-b, faces the terminal 2, the high voltage surge is fed to the terminal 2 through a spark discharge and is applied to the corresponding spark plug PL (FIG. 1) through a secondary high tension cable 7 (corresponding to $L_2$ in FIG. 1), where the fuel air mixture is ignited in the corresponding cylinder. When the rotor 1 rotates to the position indicated by the dotted line in FIG. 2-b, and the electrode of the rotor 1 faces the next terminal 2, the high voltage surge is fed to the next terminal 2 through a spark discharge and is applied to the next corresponding spark plug PL (FIG. 1) through the other secondary high tension cable 7. In a similar way, the high voltage surge is sequentially distributed.

The present invention applies to the elements which are contained in circle A indicated by the chain dotted line in FIG. 2-a. FIGS. 3 through 5 and 8 through 10 are enlarged views of said elements. In FIG. 3-a, 11 indicates the electrode which is formed as a part of rotor 1 in the form of an integral T-shaped body. A front surface 11' of the electrode 11 faces a side surface 2' of the terminal 2 with a discharging gap formed between them. Terminal 2 consists of a hollow or a solid circular shaft. The side surface 2' of terminal 2 which faces the front surface 11' is made by partially cutting out the circular shaft, whereby the side surface 2' of the terminal 2 acts as an electrode which cooperates with the electrode 11. To the base of the electrode 11, a dielectric member 12 which has a thin flat-plate form is fixed by, for example, a well-known adhesive. In FIG. 3-c, the front surface 11' of the electrode 11 faces the side surface 2' of terminal 2 with a first spark discharging gap distance $g_1$ located between them. The side surface 2' of terminal 2 also faces the front surface 12' of the dielectric member 12 with a second spark discharging gap distance $g_2$ therebetween. In this first embodiment: the first discharging gap distance $g_1$ and the second spark discharging gap distance $g_2$ are 1.2 (mm) and 0.6 (mm), respectively; the electrode 11 is made of a brass plate, the thickness of which is 1.0 (mm), and the length L (FIG. 3-b) and the width W (FIG. 3-b) are 12 (mm) and 4 (mm), respectively, and; the dielectric member 12 is made of mica, the thickness of which is 0.3 (mm). Furthermore, the dielectric member 12 can also be made from ceramics. The difference between the first spark discharging gap distance $g_1$ and the second spark discharging gap distance $g_2$, i.e., $g_1$-$g_2$, should be less than 3 mm but greater than 0.2 mm. Preferably, the difference $g_1$-$g_2$ should be less than 1.5 mm but greater than 0.5 mm.

FIGS. 4-a, 4-b and 4-c show the second embodiment according to the present invention, wherein the parts indicated by identical numerals to those shown in FIGS. 3-a, 3-b and 3-c are the same in their construction, function or materials. This is also true for the parts shown in the following FIGS. 5 and 8 through 11.

As can be seen from FIGS. 4-a, b and c, a metallic auxiliary electrode 13 which has a thin flat-plate form is further provided and fixed to said base of the dielectric member 12 of the first embodiment shown in FIG. 3. The metallic auxiliary electrode 13 can also be fixed to the dielectric member 12 by, for example, a well-known adhesive. In the second embodiment, the metallic auxiliary electrode 13 was constructed from a brass plate the thickness of which is 0.2 (mm). The other conditions, for example, the first and second spark discharging gap distances ($g_1$, $g_2$) the materials of the dielectric member 12, and the electrodes of rotor 1 and terminal 2 are the same as those of the first embodiment. The feature of the second embodiment is that the metallic auxiliary electrode is further provided to the dielectric member 12 of the first embodiment along its base periphery, thus providing the following advantages. The second embodiment has a more stabilized noise suppressing ability than that of the first embodiment, and the dielectric member 12 can be protected by the metallic auxiliary electrode 13 from external mechanical impacts. As in the first embodiment, in this embodiment the difference between the first spark discharge gap distance $g_1$ and the second spark discharging gap distance $g_2$ should be less than 3 mm but greater than 0.2 mm and preferably less than 1.5 mm but greater than 0.5 mm.

FIG. 5 shows the third embodiment according to the present invention which is a modified embodiment of the above-mentioned second embodiment shown in FIG. 4. As can be seen from FIGS. 5-a through 5-c, the feature of the third embodiment is that the metallic auxiliary electrode 13 is fixed to the outer surface periphery of the dielectric member 12, and that it provides the following advantages. The dielectric member 12 is physically protected by the metallic auxiliary electrode 13 from the spark discharge at the second discharging gap ($g_2$). This is because, the spark discharge at the second discharging gap occurs between the terminal 2 and the metallic auxiliary electrode 13, rather than between said terminal 2 and the dielectric member 12. Also, the outer peripheral area of the dielectric member 12 is protected by the electrode 13 from external mechanical impacts. In the third embodiment: the dielectric member 12 is made of mica, the thickness of which is 0.8 (mm); the metallic auxiliary electrode 13 is constructed from a brass plate the thickness of which is 0.2 (mm) and; the other afore-mentioned conditions, are the same as those of the first embodiment. As in the first two embodiments, in this embodiment, the difference between the first spark discharging gap distance $g_1$ and the second spark discharging gap $g_2$ should be less than 3 mm but greater than 0.2 mm and preferably less than 1.5 mm but greater than 0.5 mm.

The present invention can be well realized by the first, second or third embodiment, any of which forms the basic constructions of the present invention. The effect for suppressing noise will now be explained by using the second embodiment as an example. However, it should be noted that the first embodiment, the third embodiment and the following fourth, fifth and sixth embodiments which will be explained later are also able to provide nearly the same effect for suppressing noise, as that of the second embodiment. The wave forms indicated by the solid line e and the dotted line d in FIG. 6 respectively show the changes of the capacity discharge current according to the present invention and to the prior art. The coordinates indicate a capacity discharge current I in (A), and the time in (n sec). It should be clear from FIG. 6, that the maximum capacity discharge current I according to the present invention, indicated by the solid line e, is considerably reduced compared to the maximum capacity discharge current according to the prior art indicated by the dotted line d. Further, the rise time and the pulse width of the capacity discharge current I, according to the present invention, are considerably expanded compared to those of the prior art. Thus, a capacity discharge current of the prior art which includes deleterious high frequency components and consequently emits strong noise, is transformed to a capacity discharge current of the present invention which has almost no deleterious high frequency components, thereby drastically reducing the noise. The above-mentioned facts can be proved by the measurements shown in FIGS. 7-H and 7-V, which are graphs clarifying the advantages of the present invention compared to the prior art. Coordinates of FIG. 7-H indicate the noise-field intensity of the horizontal polarization and the frequencies of the noise. This frequency is indicated in (MH$_z$), while the noise-field intensity is indicated in (dB) in which 0 (dB) corresponds to 1 (uv/m). Further, in FIG. 7-V the abscissa indicates the same as explained in FIG. 7-H and the other coordinate indicates the noise-field intensity of the vertical polarization. In FIGS. 7-H and 7-V, the performances of the present invention and the prior art are indicated by the solid lines $g_H$ and $g_V$, and the dotted lines $f_H$ and $f_V$, respectively. The measurements indicated by the solid lines ($g_H$ in FIG. 7-H and $g_V$ in FIG. 7-V) were obtained by using a vehicle including a distributor in accordance with the second embodiment of the present invention (shown in FIG. 4), which vehicle further included typical conventional resistive spark plugs and a resistive high tension cable. The measurements indicated by the dotted lines were obtained by using a vehicle including only conventional resistive spark plugs and a resistive high tension cable. It should be quite clear from FIGS. 7-H and 7-V that the noise-field intensity from the igniter of the present invention is considerably minimized compared to that of the prior art and accordingly the present invention remarkably suppresses said strong noise. Although the process for suppressing noise can actually be achieved by a combination of the complicated phenomena of discharges, only one possible reason for this result is offered below.

The high voltage surge induced in the secondary winding S is fed to both the first discharging gap ($g_1$) and the second discharging gap ($g_2$) at the same time. Since the second discharging gap distance $g_2$ (FIG. 4-c) is shorter than the first discharging gap distance $g_1$ (FIG. 4-c), a partial discharge occurs at the beginning of the process in the second discharging gap with a relatively low voltage with respect to the high voltage surge during an interval where a voltage at the first and second discharging gaps between the rotor 1 and the terminal 2 is increasing gradually toward the maximum voltage which is 10 to 30 (KV), as previously mentioned. Then, air existing in the space near the metallic auxiliary electrode 13 of the second discharging gap ($g_2$) is ionized and thus enables the spark discharge to occur easily at the first discharging gap ($g_1$). Said spark discharge at the second discharging gap ($g_2$) is transferred to the first discharging gap ($g_1$) by the help of said ionization. The transfer of the spark discharge is mainly carried out by a surface creepage which occurs on the top surface of the dielectric member 12 defined by the zone $g_1$-$g_2$ in FIG. 4-C. Then, a further spark discharge occurs at the first discharging gap ($g_1$). It should be understood from the above-mentioned explanation that the time duration needed to produce the spark discharge at the first discharging gap according to the present invention, is longer than the time duration needed in the prior art. This is because, the spark discharge at the first discharging gap is transferred from the spark discharge at the second discharging gap through said surface creepage which crawls along the surface of the dielectric member 12 of the present invention. Since the spark discharge between the rotor 1 and the terminal 2 is produced slowly, the capacity discharge current includes no discharge pulses with extremely small widths and extremely large amplitudes. Furthermore, the spark discharge between the rotor 1 and the terminal 2, according to the present invention, is stable compared to the prior art which has no dielectric member therebetween. This is because, the electric charge which is charged on the surface of the dielectric member 12 during the production of spark discharge at the second discharging gap ($g_2$), contributes beneficially to the stability of the spark discharge at the first discharging gap ($g_1$).

FIGS. 8-a and 8-b show a fourth embodiment according to the present invention. The fourth embodiment is basically similar to the third embodiment, although the partially-circular-shaped dielectric member 12 shown in FIG. 5, is divided into many sections each having a metallic auxiliary electrode 13. Each section is arranged along the front surface 11' of the electrode 11 with a constant pitch. The above-mentioned constructional feature of the fourth embodiment provides the following advantage. Even if at least one of said sections is broken by mishandling during the manufacturing process, the efficiency of the second discharging gap ($g_2$) can still be maintained at a normal level by the other sections which are still intact. It should be noted that the probability of all of the dielectric members 12 and/or all of the metallic auxiliary electrode 13 being broken at the same time in the actual manufacturing process is zero. In the fourth embodiment: the thicknesses of both the electrode 11 and the dielectric member 12 are each 1.5 (mm); the gap distances of gap $g_1$ and gap $g_2$ are 1.4 (mm) and 0.4 (mm), respectively; each metallic auxiliary electrode 13 of the sections was made from brass plate the thickness of which was 0.2 (mm); the number of said sections is six and; and the aforementioned other conditions are the same as those of the first embodiment. In this embodiment, as in the preceding embodiments, the difference between the first spark discharging gap distance $g_1$ and the second spark discharging gap distance $g_2$ should be less than 3 mm but greater than 0.2 mm and preferably less than 1.5 mm but greater than 0.5 mm.

FIGS. 9-a and 9-b show a fifth embodiment according to the present invention. The fifth embodiment is basically similar to the fourth embodiment, although the metallic auxiliary electrodes 13 (shown in FIGS. 8-a and 8-b) are not included. The advantage of the fifth embodiment is the same as the advantage mentioned above with reference to FIGS. 8-a and 8-b. In the fifth embodiment: the thicknesses of both the electrode 11 and the dielectric member 12 are each 1.5 (mm); the gap distances of $g_1$ and $g_2$ are 1.4 (mm) and 0.4 (mm), respectively; the number of sections is six; and the aforementioned other conditions are the same as those of the first embodiment. In this embodiment, as in the preceding embodiments, the difference between the first spark discharging gap distance $g_1$ and the second spark discharging gap distance $g_2$ should be less than 3 mm but greater than 0.2 mm and preferably less than 1.5 mm but greater than 0.5 mm.

In the first, second, third, fourth and fifth embodiments, the dielectric members 12 are fixed to only the rotor. However, the dielectric member 12 can be fixed to only the stationary terminal, and they can be fixed to both the rotor and the stationary terminal without reducing their effectiveness for suppressing noise. These two cases are shown in FIGS. 10 and 11. Experiments resulted in learning that the effectiveness for suppressing noise of the sixth embodiment shown in FIG. 10 and of the seventh embodiment shown in FIG. 11 is nearly the same as that of the second embodiment.

In FIGS. 10-a and 10b, the various conditions are the same as those of the first embodiment. In addition, the metallic auxiliary electrode can be attached, if necessary, to the peripheral area of the dielectric member 12.

In the embodiment of FIG. 10, as in the preceding embodiments, the difference between the first spark discharging gap distance $g_1$ and the second spark discharging gap distance $g_2$ should be less than 3 mm but greater than 0.2 mm and preferably less than 1.5 mm but greater than 0.5 mm. The auxiliary electrode 13 can be attached to the dielectric member 12 as shown in FIG. 10-c.

In FIGS. 11-a and 11-b, the various conditions are the same as those of the first embodiment. In addition, the metallic auxiliary electrode can be attached, if necessary, to the peripheral areas of the dielectric members 12 which are fixed to the rotor and/or the stationary terminal. As in the preceding embodiments, in this embodiment, the difference between the first spark discharging gap distance $g_1$ and the second spark discharging gap distance $g_2$ should be less than 3 mm but greater than 0.2 mm and preferably less than 1.5 mm but greater than 0.5 mm. The auxiliary electrodes 13 can be attached to the dielectric members 12 as shown in FIG. 11-c.

Thus, the strong noise from a distributor is considerably suppressed by utilizing the rotor 1 and the stationary terminals 2 which include the dielectric member 12, offered in the afore-mentioned first, second, third, fourth, fifth, sixth or seventh embodiments.

As mentioned above, the distributor according to the present invention is extremely effective in suppressing noise intensity and furthermore, can be industrially realized. Moreover, it should be noted that the distributor according to the present invention can be applied to an internal combustion engine, together with the typical conventional apparatus for suppressing noise such as the resistive spark plug and/or the resistive high tension cable, since the typical conventional apparatus for suppressing noise is beneficial to and does not interfere with the distributor of the present invention.

What is claimed is:

1. A distributor for an internal combustion engine, containing an apparatus for suppressing noise, comprising:
    a distributor rotor having an electrode attached thereto which is located in the distributor and rotates at the same pace as the rotation of a distributor driving shaft driven by the internal combustion engine;
    a distributor cap containing a plurality of stationary terminals which are located in the distributor cap and are arranged along a circular locus defined by the rotation distributor rotor electrode with a first discharging gap maintained between the terminals and the distributor rotor electrode;
    a dielectric member positionable on at least one of said terminals and said electrode to define a second discharging gap, wherein both the dielectric member and the second discharging gap are located between the terminals and the distributor rotor electrode and close to the first discharging gap, the difference between the first spark discharging gap distance and the second spark discharging gap distance being less than 3mm but greater than 0.2mm.

2. A distributor for an internal combustion engine, containing an apparatus for suppressing noise as set forth in claim 1, wherein said dielectric member is made of mica.

3. A distributor for an internal combustion engine, containing an apparatus for suppressing noise as set forth in claim 1, wherein said dielectric member is made from ceramics.

4. A distributor for an internal combustion engine, containing an apparatus for suppressing noise as set forth in claim 1, further comprising a metallic auxiliary electrode, wherein said first discharging gap is formed between the surface of the outer periphery of the distributor rotor and one side of each of the stationary terminals as the rotor reaches the position of each terminal, and said second discharging gap is formed between one side of each of the stationary terminals and one side of the metallic auxiliary electrode which is attached to the peripheral area of the bottom of said dielectric member which is fixed to the peripheral area of the bottom of said distributor rotor.

5. A distributor for an internal combustion engine, containing an apparatus for suppressing noise as set forth in claim 1, further comprising a metallic auxiliary electrode, wherein said first discharging gap is formed between the surface of the outer periphery of the distributor rotor and one side surface of each of the stationary terminals as the rotor reaches the position of each terminal and said second discharging gap is formed between one side surface of the stationary terminal and the surface of the outer peripheral surface of the metallic auxiliary electrode which is attached to the surface of the outer peripheral side of said dielectric member which is fixed to the peripheral area of the bottom of said distributor rotor.

6. A distributor for an internal combustion engine, containing an apparatus for suppressing noise as set forth in claim 1, wherein said dielectric member is divided into a plurality of segments, a metallic auxiliary electrode divided into a plurality of segments each of which is secured to the outer peripheral surface of a respective one of the segments of the dielectric member, said second discharging gap is formed between one side of each of the stationary terminals as the rotor reaches the position of each terminal and the surfaces of the plurality of segments of the metallic auxiliary electrode, each of said dielectric member segments being attached to the surface of the outer periphery of the distributor rotor with a predetermined pitch along that surface, and said first discharging gap is formed between one side of the stationary terminal and the surface of the outer periphery of the distributor rotor where said segments of the dielectric member and the metallic auxiliary electrode are not attached.

7. A distributor for an internal combustion engine, containing an apparatus for suppressing noise as set forth in claim 1, wherein said second discharging gap is formed between one side of each of the stationary terminals as the rotor reaches the position of each terminal and the surfaces of a plurality of segments made of said dielectric member, each of said dielectric member segments being attached to the surface of the outer periphery of the distributor rotor with a predetermined pitch along this surface and said first discharging gap is formed between one side of the stationary terminal and the surface of the outer periphery of the distributor rotor where said segments made of the dielectric member are not attached.

8. A distributor for an internal combustion engine, containing an apparatus for suppressing noise as set forth in claim 1, wherein said first discharging gap is formed between the surface of the outer periphery of the distributor rotor and one side surface of each of the stationary terminals as the rotor reaches the position of each terminal, said second discharging gap is formed between the surface of the outer periphery of said distributor rotor and the surface of the inner periphery of said dielectric member, and said dielectric member is attached to the base of each of said stationary terminals.

9. A distributor for an internal combustion engine, containing an apparatus for suppressing noise as set forth in claim 1, further comprising a second dielectric member and means defining an additional second discharging gap, wherein said first discharging gap is formed between the surface of the outer periphery of the distributor rotor and one side of each of the stationary terminals as the rotor reaches the position of each terminal, said first mentioned second discharging gap is formed between one side surface of each of the stationary terminals and a surface of the outer periphery of said first mentioned dielectric member which is attached over the top surface of said distributor rotor, and said additional second discharging gap is formed between the surface of the outer periphery of said distributor rotor and a surface of the inner periphery of said second dielectric member which is attached to the base of each of the stationary terminals.

10. A distributor for an internal combustion engine, containing an apparatus for suppressing noise, as set forth in claim 1, wherein:
the difference between the first spark discharging gap distance and the second spark discharging gap distance is less than 1.5mm but greater than 0.5mm.

* * * * *